United States Patent
Suffern (10) Patent No.: US 8,024,609 B2
(45) Date of Patent: Sep. 20, 2011

(54) FAILURE ANALYSIS BASED ON TIME-VARYING FAILURE RATES

(75) Inventor: Edward S. Suffern, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 12/477,199

(22) Filed: Jun. 3, 2009

(65) Prior Publication Data

US 2010/0313072 A1 Dec. 9, 2010

(51) Int. Cl.
G06F 11/00 (2006.01)
(52) U.S. Cl. .............. 714/25; 714/26; 714/47.1; 714/48
(58) Field of Classification Search .................. 714/25, 714/26, 47, 48, 37, 47.1
See application file for complete search history.

(56) References Cited

U.S. PATENT DOCUMENTS

| | | | |
|---|---|---|---|
| 5,287,505 A * | 2/1994 | Calvert et al. ................... 1/1 |
| 5,349,674 A * | 9/1994 | Calvert et al. ................. 709/227 |
| 5,465,321 A | 11/1995 | Smyth |
| 5,633,999 A | 5/1997 | Clowes et al. |
| 6,405,329 B1 * | 6/2002 | Colligan et al. ................ 714/57 |
| 6,587,960 B1 * | 7/2003 | Barford et al. ................... 714/8 |
| 7,206,771 B2 * | 4/2007 | Alvarez et al. ................. 706/45 |
| 7,313,573 B2 * | 12/2007 | Leung et al. ..................... 1/1 |
| 7,340,649 B2 * | 3/2008 | Angamuthu et al. ........... 714/27 |
| 7,350,106 B2 * | 3/2008 | Longere .......................... 714/25 |
| 7,401,263 B2 * | 7/2008 | Dubois et al. .................. 714/47 |
| 7,409,595 B2 * | 8/2008 | Nissan-Messing et al. .... 714/26 |
| 7,509,537 B1 * | 3/2009 | Jensen et al. .................... 714/47 |
| 7,730,363 B2 * | 6/2010 | Takezawa et al. .............. 714/47 |
| 7,757,123 B1 * | 7/2010 | Gasser et al. ................... 714/27 |
| 7,870,440 B2 * | 1/2011 | Vacar et al. ...................... 714/48 |
| 2003/0167111 A1 * | 9/2003 | Kipersztok et al. ............. 701/29 |
| 2004/0205398 A1 * | 10/2004 | Osborn et al. ................... 714/25 |
| 2005/0160189 A1 | 7/2005 | McNeill, Jr. et al. |
| 2005/0193227 A1 * | 9/2005 | Nakahara et al. ................. 714/4 |
| 2006/0143419 A1 | 6/2006 | Tulyani |
| 2006/0161819 A1 * | 7/2006 | Nissan-Messing et al. .... 714/48 |
| 2007/0035901 A1 | 2/2007 | Albrecht et al. |
| 2007/0165381 A1 | 7/2007 | Kuo |
| 2007/0244827 A1 | 10/2007 | Candelore et al. |
| 2007/0288795 A1 * | 12/2007 | Leung et al. .................... 714/26 |
| 2008/0059839 A1 * | 3/2008 | Hamilton et al. ............... 714/26 |
| 2008/0255785 A1 * | 10/2008 | Gross et al. ..................... 702/79 |
| 2008/0320332 A1 * | 12/2008 | Brown et al. ................... 714/38 |
| 2009/0019544 A1 | 1/2009 | Suffern et al. |
| 2009/0040135 A1 | 2/2009 | Piazza et al. |
| 2009/0089604 A1 * | 4/2009 | Malik et al. ................... 713/340 |
| 2009/0254781 A1 * | 10/2009 | Bonaccio et al. ............... 714/48 |
| 2009/0300430 A1 * | 12/2009 | Nissan-Messing et al. .... 714/48 |
| 2010/0306588 A1 * | 12/2010 | Hamilton et al. ............... 714/26 |

* cited by examiner

*Primary Examiner* — Robert W Beausoliel, Jr.
*Assistant Examiner* — Joshua P Lottich
(74) *Attorney, Agent, or Firm* — Cynthia G. Seal; Jeffrey L. Streets (57) ABSTRACT

Failure analysis method and apparatus using failure rate data in coordination with the power on hours to more efficiently resolve computer system failures without occupying system memory or processor bandwidth. In response to a system failure, a baseboard management controller (BMC) notes the time of failure and the elapsed operating time of system components. In response to a failure of the computer system, the BMC accesses industry standard failure rate data correlating the elapsed operating time with the probability of failure for each component. By cross-referencing the time of failure with the failure rate data, the BMC automatically determines the probability of failure of each component at the time of failure of the computer system. The BMC generates a component replacement list identifying the component that currently has the highest probability of failure.

20 Claims, 4 Drawing Sheets

| System Component Failures | | | | | | |
|---|---|---|---|---|---|---|
| | 1 KPOH | | 50 KPOH | | 100 KPOH | |
| Component | Failure Rate (Parts) | Probability of Failure | Failure Rate (Parts) | Probability of Failure | Failure Rate (Parts) | Probability of Failure |
| HDD | 40 | 83% | 3 | 19% | 13 | 10% |
| Graphics Card | 5 | 10% | 2 | 13% | 10 | 8% |
| DIMMs | 2 | 4% | 4 | 25% | 93 | 74% |
| Processor | 1 | 2% | 7 | 44% | 10 | 8% |

FAILURE ANALYSIS BASED ON TIME-VARYING FAILURE RATES

BACKGROUND OF THE INVENTION

1. Field of the Invention

The present invention relates to the maintenance and repair of computer systems, and more particularly to the use of failure analysis to diagnose and correct computer system failures.

2. Background of the Related Art

Failure analysis is a process of analyzing a system, such as a computer system, to attempt to determine the cause of a failure or to prevent a failure from occurring or recurring. Predictive Failure Analysis (PFA) is a technology developed by IBM for anticipating the failure of components of a computer system. According to PFA, some key physical parameters of a hardware device (e.g. the head flying height of a hard disk drive) can be measured and compared against predefined thresholds to predict if failure of the device is imminent. The hardware device can generate an alert in advance of (e.g. up to 48 hours prior to) a likely failure of the device. This advance notice of potential failure gives the system administrator ample warning to either hot-swap the component (if applicable) or schedule downtime for the component to be changed or refreshed.

Cost considerations limit the extent to which failure analysis tools and methods can be implemented on some computer systems. For example, the cost constraints of desktop workstation blades in a blade server environment may limit or preclude the use of hardware required to implement some of the predictive failure analysis tools, such as counting single-bit memory errors, parity errors on hard disk drive memory reads, or memory bit drop-outs in a flash device with more than 100,000 write/erase cycles. Additional hardware and associated cost are required for each PFA function. To be cost competitive with stand-alone workstations, this additional cost is prohibitive.

BRIEF SUMMARY OF THE INVENTION

Embodiments of the present invention include failure analysis systems and methods. One embodiment provides a computer-implemented method that includes obtaining failure rate data correlating the elapsed operating time with the probability of failure for each of a plurality of components of a computer system. The elapsed operating time of each component of the computer system is tracked using a baseboard management controller without the participation of the operating system, the central processing unit of the computer system, and system memory. In response to a failure of the computer system, the probability of failure of each component at the time of failure of the computer system is automatically determined from the failure rate data. A component replacement list is generated indicating the component having the highest probability of failure at the time of failure.

DETAILED DESCRIPTION OF THE INVENTION

The invention includes systems and methods for performing failure analysis on a computer system. The systems and methods provide reliability and precision, and may be implemented with no additional hardware and at little or no additional cost as compared with conventional failure analysis systems and methods. Failure analysis, according to an embodiment of the invention, may be performed by a baseboard management controller of the computer system to be analyzed. Consequently, the failure analysis may be performed without the participation of the operating system, the central processing unit of the computer system, and system memory (e.g. volatile memory such as DIMMs and non-volatile memory such as a hard disk drive). Thus, finite system resources such as CPU bandwidth and system memory can be entirely dedicated to storing and running the operating system and the software applications, without allocating any of these resources to the failure analysis. The failure analysis may therefore be performed very efficiently. The failure analysis may also be performed without requiring specialized hardware that would otherwise increase the cost of the computer system. Although the principles taught herein may be applied to any target computer system, embodiments of the invention are discussed primarily in the context of networked workstation blades.

Figure 1:
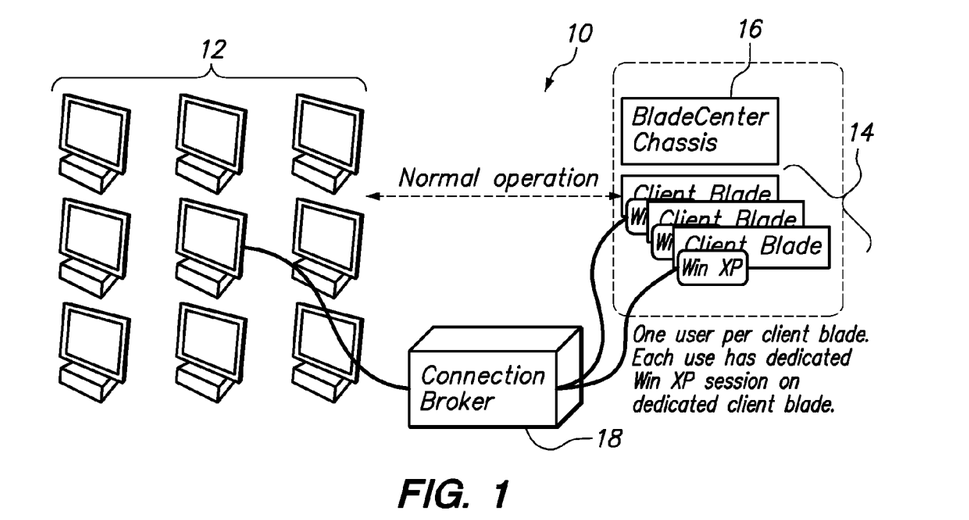
FIG. 1 is a diagram of an example computer system on which failure analysis may be performed according to an embodiment of the invention.

FIG. 1 is a diagram of one example of a computer system 10 on which failure analysis may be performed according to an embodiment of the invention. The computer system 10 includes a plurality of thin client terminals 12 remotely connected to workstation blades 14 centrally housed in a blade server type chassis 16. The workstation blades 14 remote the user desktop experience by placing a processor subsystem and other hardware-type system components in a blade server form factor. As generally understood in the art, the workstation blades 14 take high-resolution video, compress the video, packetize the video into TCP/IP packets, and transmit the packets over a network, such as an Ethernet local or remote area network, using a connection broker 18. Each thin client terminal 12 is connected over the network to a respective workstation blade 14, with each client terminal 12 and workstation blade 14 serving a single user. The workstation blades 14 in the blade server type chassis 16 need to be cost-effective. The failure analysis methods disclosed herein may be implemented on the computer system 10 using less complex hardware than other failure analysis systems and methods. The failure analysis methods of the present invention may also be performed without any participation from the operating system, and with little or no CPU bandwidth.

Figure 2:
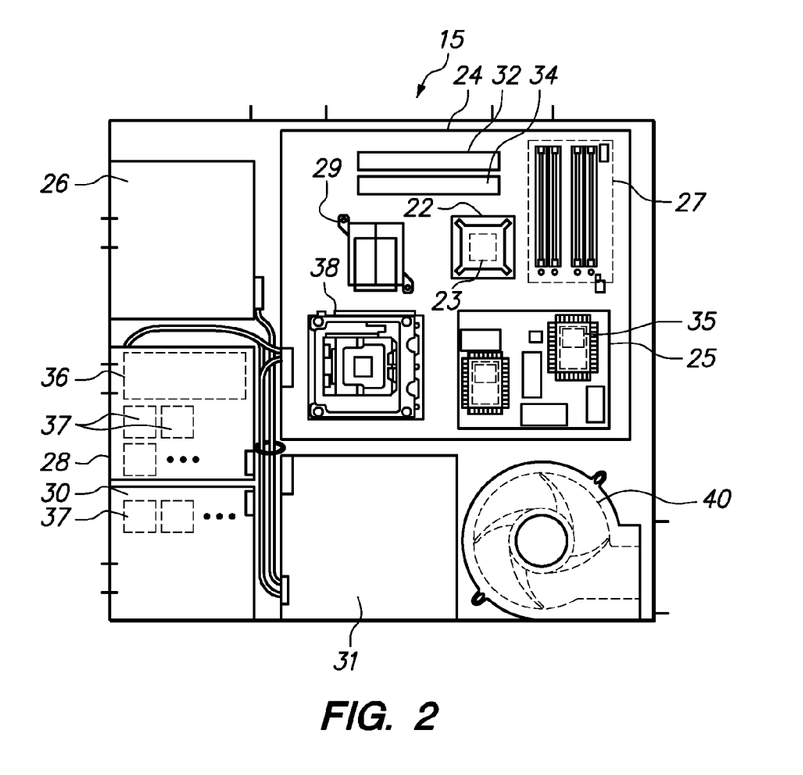
FIG. 2 is a diagram of an example configuration of the workstation blade of FIG. 1.

FIG. 2 is a diagram of an example configuration of a target computer system 15 on which failure analysis may be performed as taught herein. The target computer system 15 contains many system components, some of which are shown by way of example. The system components include a motherboard 24, an optical disc bay 26, removable primary and secondary hard disk drives 28, 30, a power supply 31, and a cooling fan 40. The motherboard 24, itself, typically includes many components, ranging from basic circuit elements such as capacitors and resistors, to more complex hardware and subsystems, such as one or more processors and system memory, many of which are omitted from view in FIG. 2. Illustrated components of the motherboard 24 include a central processing unit (CPU) 38, a baseboard management controller (BMC) 25, volatile system memory including DIMMs 27, a BIOS-ROM 22 containing a BIOS graphics driver 23, a graphics card 32 and compression card 34, and internal connectors 29 for connecting additional hardware.

The illustrated components and particular component layout of the target computer system 15 are provided merely as a reference for discussing the failure analysis methods disclosed herein. Though the components and component layout of a computer system and its motherboard will vary from system to system, one skilled in the art will appreciate that the failure analysis methods described may be applied to specific other computer systems whose component selection and component layout varies from what is illustrated in FIG. 2. For example, one skilled in the art having benefit of this disclosure would be able to apply the failure analysis methods to the workstation blade 14 of FIG. 1, which typically would omit the on-board power supply 31 and cooling fan 40 of FIG. 1 in lieu of an external power module and blower module shared by multiple workstation blades.

Referring again to FIG. 2, an operating system 36 resides in non-volatile memory on the primary hard disk drive 28. The operating system 36 is software that acts as a host for software applications 37 residing on one or both of the primary and secondary hard disk drives 28, 30. The operating system 36 and software applications 37 contain computer usable instruction code that gets loaded into volatile system memory provided on the DIMMs 27, where the instruction code is directly accessed and executed by the CPU 38. The software applications occupy some of the finite memory space within the DIMMs 27. Execution of the software applications use some of the limited processor bandwidth provided by the CPU 38. It is desirable to optimize the use of finite computing resources such as system memory and processor bandwidth when possible.

The BMC 25 is part of the Intelligent Platform Management Interface (IPMI) architecture. Conventionally, a BMC manages the interface between system management software and platform hardware in a computer system. Different types of sensors built into the target computer system 15 and in other computer systems report to the BMC on parameters such as temperature, cooling fan speeds, power mode, operating system (OS) status, etc. The BMC 25 monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again.

According to one embodiment of the invention, an extra software module 35 is added to the BMC that provides additional functionality for performing predictive failure analysis. The additional functionality of the BMC 25 includes the ability to track the elapsed operating time of each component of the target computer system 15. This function is very relevant and useful to this embodiment because certain components such as memory DIMMs 27, the hard drives 28, 30 or the CPU 38 can be placed in a low power or sleep state based on the inactivity of that resource. In response to a failure of the target computer system 15, the BMC 25 may automatically determine the probability of failure of each component at the time of failure of the computer system using predetermined failure rate data that correlates the elapsed operating time with the probability of failure for each of the components. The BMC 25 generates a component fault signal indicating the component having the highest probability of failure (POF) at the time of failure.

Whereas the operating system 36 and software applications 37 reside on the hard disk drives 26, 28 and get loaded into the DIMMs 27 for execution by the CPU 38, the BMC software module 35 resides on the BMC 25 and is executed by the BMC 25. Thus, the BMC 25 may perform the failure analysis described herein without participation of the operating system 36 and without the use of the CPU 38, so as not to require any of the finite system memory and processor bandwidth.

Figure 3A:
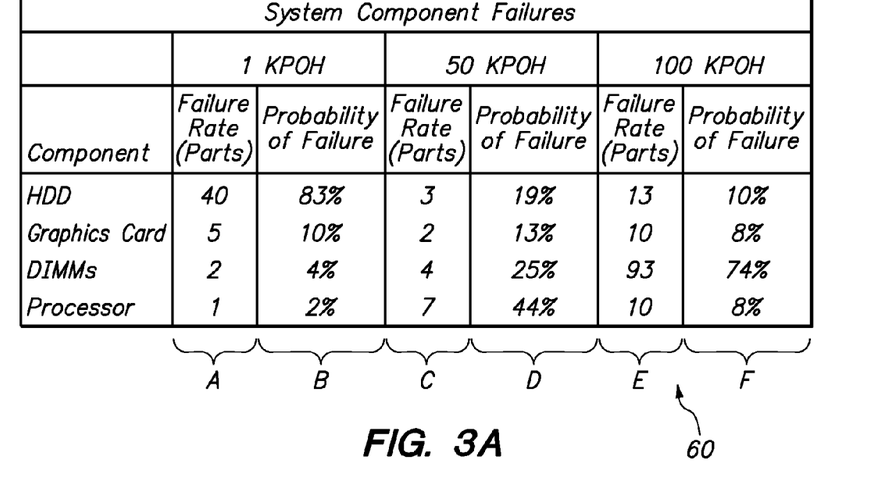
FIG. 3A is a table listing and comparing predetermined failure rate data for selected components of a computer system based on the number of power on hours for the computer system.

FIG. 3A is a table 60, entitled System Component Failures, listing and comparing predetermined failure rate data for selected components of a target computer system based on the number of power on hours for the target computer system. The selected components include, by way of example, a hard disk drive (HDD), a graphics card, dual in-line memory modules (DIMMs), and a processor (e.g. a CPU). The System Component Failures table 60 includes six columns of failure rate data for selected components at 1 KPOH, 50 KPOH, and 100 KPOH. The failure rate for a component is the frequency with which an engineered system or component fails. Standards have been promulgated for how the failure rate of computer system components is to be determined. The total number of system components and associated failure rates are used in the "parts count" prediction for the system failure. This methodology is generally known in the art apart from its application in the context of the present invention. The parts count prediction uses generic failure rates for various component types given an operating environment and temperature, multiplies them by a quality factor, and then adds them up to obtain a system failure rate. This methodology is specifically defined in the MIL-HDBK-217, Telcordia, and GJB/z 299B standards.

Columns A, C, and E list the number of failures of the devices in terms of a part count for 1, 50, and 100 KPOH, respectively. The Telcordia standard lists the failure rate of components in percentages at different POH. For example, the hard drive has a failure rate of 4% during the first 1000 hours of operation due to initial start-up defects. In the art, this number is interpreted to mean that forty parts will fail on 1000 servers in the first hour of operation. However, once the start-up problems are eliminated during the next 50,000 hours of operation, the failure rate drops to 0.006%. Note that the number of failures drops down to three once the start-up problems are eliminated, s reflected by the numbers in Columns A and C. In the table, Column A shows that in the first 1 KPOH, the failure rate for the HDD is forty parts, the failure rate for the graphics card is five parts, the failure rate for the DIMM is two parts, and the failure rate for the processor is one part, for a total of forty-eight parts. The parts count data from columns A, C, and E of the table 60 is plotted in the graph 80 of FIG. 3B.

Columns B, D, and F list the probability of failure of each component at 1, 50, and 100 KPOH, respectively, based on the failure rates shown in Columns A, C, and E. The listed percentages indicate the probability that each component has caused a system failure, given that the cause of failure of the computer system or subsystem has been narrowed to a failure of one of the listed components. For example, at 1 KPOH, the chance that the HDD is the cause of failure of the computer system or subsystem is about 83%, which is computed as forty parts divided by forty-eight total parts. Likewise, the chance that the graphics card, DIMMs, or processor is the failed component at 1 KPOH is 10%, 4%, and 2%, respectively.

Figure 3B:
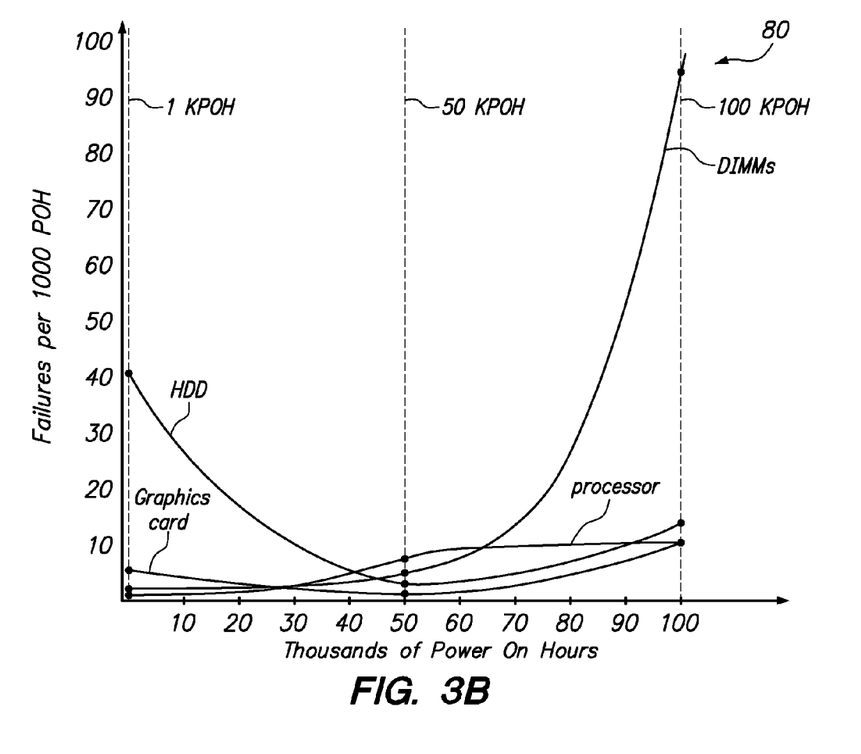
FIG. 3B is a graph consistent with the predetermined failure rate data of FIG. 3A.

FIG. 3B is a graph consistent with the predetermined failure rate data of FIG. 3A. As the graph 80 demonstrates, the failure rate of a component is time dependent, in that the failure rate, itself, changes over time during the life cycle of the component. For example, the HDD is typically less reliable at the beginning of its life cycle, with a parts count of forty and a probability of failure of about 83% at about 1 KPOH. The HDD later stabilizes, with a failure rate of only three parts and a probability of failure of only 19% at 50 KPOH. By contrast, the DIMMs are very reliable in the initial stages of use, but get less reliable over time. Here, the DIMMs have a failure rate of only two parts at 1 KPOH, but the failure rate increases dramatically to ninety-three parts and 74% probability of failure at about 100 KPOH. In recognition of this time-varying failure rate of the individual components, embodiments of the invention are directed to ascertaining which one of a plurality of components is the probable cause of a computer system failure based on the failure rate data and the elapsed number of power-on hours.

To simplify discussion, the table of FIG. 3A and the graph of FIG. 3B assumes that each of the listed components has the same number of power-on hours. For example, at the 50 KPOH line of FIG. 3B, it is assumed that the HDD, graphics card, DIMMs, and Processor all have an elapsed operating time of 50 KPOH. This assumption will generally hold true for a new computer system having all new parts. After a period of use, however, parts from a computer system are likely to get removed and replaced due to wearing out or failing, or to be powered down when not in use while other parts will continue to work for many power-on hours beyond the point at which other parts fail. As a result, a target computer system will commonly include different components having different elapsed operating times. The probability of failure may be determined reflecting the actual KPOH of each component. Thus, if a component is replaced, the BMC should recognize that the component is new and initialize the KPOH for that new component at zero.

Figure 4:
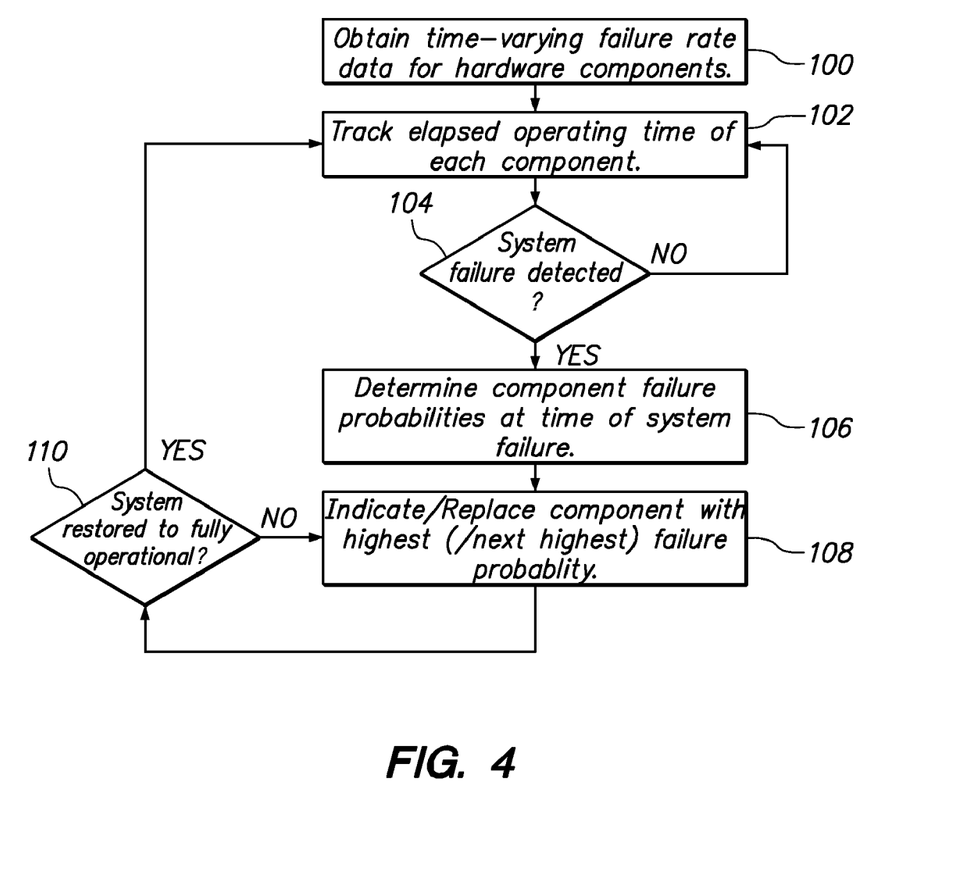
FIG. 4 is a flowchart outlining a failure analysis method according to an embodiment of the invention that can be applied to a workstation blade or other target computer system.

FIG. 4 is a flowchart outlining a failure analysis method according to an embodiment of the invention. The method may be used, specifically, for performing failure analysis on the workstation blade 14 of FIG. 1. More generally, the method may be used for performing failure analysis on the target system 15 of FIG. 2, which may represent any computer system having a plurality of cooperating components, and wherein the failure of any one of the components constitutes a failure of the computer system.

In step 100, time-varying failure rate data is obtained for components of a computer system. The failure rate data correlates the elapsed operating time with the probability of failure for each of a plurality of components of the computer system to be analyzed. An example of time-varying failure rate data for components of a target computer system, such as a workstation blade, was provided in FIG. 3.

In step 102, the elapsed operating time of each component is tracked. This step 102 may be performed entirely by the BMC of a computer system, which is in direct electronic communication with the components supported. A software module may be added to the BMC for tracking the elapsed operating time of the components. The elapsed operating time may therefore be tracked by the BMC directly, rather than by the operating system, so that the failure analysis method may be performed without using processor bandwidth or system memory.

Conditional step 104 invokes a determination of whether a system failure has occurred. In the present context, a failure typically involves a user recognizing that the system is not operational or malfunctioning. Recognizing a failure does not require the user to understand or identify all the symptoms of the failure. The overall reliability of a computer system depends, in part, upon the reliability of its individual components, so the failure of one component can cause the computer system or one of its subsystems to fail. An unexpected loss of video in a computer system, for example, would constitute a failure of the computer system that may be caused by the failure of one or more of its components while other components or subsystems remained fully operational.

The BMC will track the elapsed operating time of the various components according to step 102. When a failure is detected in step 104, the BMC records the time of failure and the elapsed operating time of each component at the time of failure. The time of failure does not need to be precisely determined, however. For example, when working with components whose reliability varies over a KPOH time scale, the failure analysis will not be appreciably affected if the failure is not noticed for several hours or days. Thus, for most practical purposes, the time that the failure is detected may be treated as the time of failure. However, some computer systems have the ability to automatically detect a failure and precisely record the time of failure. For example, the existing system of sensors in communication with the BMC may generate fault alerts for the attention of a BMC. An automobile's engine control unit (ECU) is another example of a computer system that may generate fault alerts and precisely register the time of failure.

In step 106, the probability of failure of each component is determined by the BMC according to the probability of failure at the time of failure. The BMC also performs this step 106 without the operating system and without using the CPU, so as not to affect the operating system or operating system performance. In response to detecting a failure in step 104, the BMC references the predetermined failure rate data obtained in step 100 and the elapsed operating time of the components in order to determine the probability of failure of each component at the time of failure.

In step 108, the component(s) with the highest probability of failure, as determined by the BMC, are indicated. The component fault signal may cause an alert to be automatically generated and sent by the BMC to the system administrator over the network. Alternatively, the component fault signal may be a signal used to generate a visible or audible alert on or near the component having the highest determined probability of failure, to assist the administrator with locating the component having the highest probability of failure. Normally, the cause of failure is placed in the system event log that can later be accessed by industry standard Intelligent Platform Management Interface (IPMI) commands.

To further facilitate the failure analysis, the component replacement signal may indicate a listing of the components according to their individual probability of failure. The listing may be displayed in the form of a table generated on a computer screen indicating the different failure probabilities of the various components, so that an administrator could selectively replace one or more components, starting with the component having the highest probability of failure.

According to step 110, components could be replaced in order of decreasing probability of failure until the failure of the computer system is resolved. If replacing the component with the highest probability of failure does not resolve the computer system failure, the component with the next highest probability of failure could then be replaced, and so on, until the computer system failure is resolved.

The method outlined in FIG. 4 may be used to supplement scheduled maintenance of computer systems. Conventionally, scheduled maintenance procedures are performed without regard to the probability of failure of the components. The cause of failure of a computer system can not always be isolated to a single component without first narrowing the cause of failure to a subset of components, such as two or perhaps three components. A common analysis tool includes the use of Maintenance Analysis Procedures (MAPs), which is a flowchart to assist a customer or field engineer in better isolating failures. Conventionally, the failure symptom(s) may allow the cause of failure to be narrowed to a group of components. However, the failure symptom(s), alone, would not indicate the probability of each component in the group causing the failure.

Figure 5:
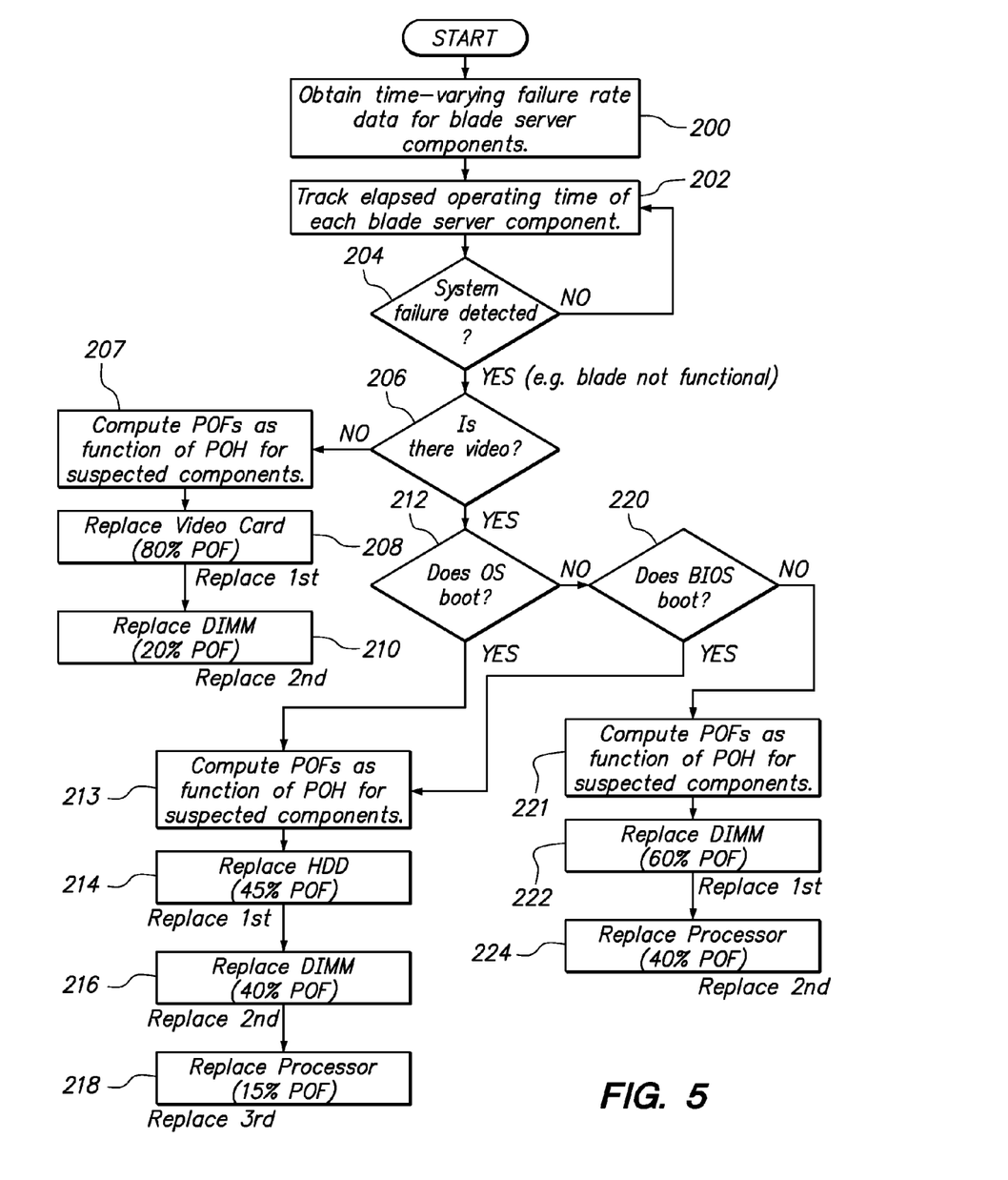
FIG. 5 is a flowchart for a maintenance analysis procedure according to another embodiment of the invention, incorporating the use of time-varying failure rate data more generally outlined in FIG. 4.

FIG. 5 is a flowchart of a Maintenance Analysis Procedure (MAP) for a target computer system, discussed by way of example in the context of a workstation blade. The time-varying failure rate and the elapsed operating time of the components logged by the BMC can improve the failure rate analysis by providing a much more accurate assessment of the component to be replaced. The probability of failure analysis described above is uniquely incorporated with the flowchart to produce a very efficient MAP.

In step 200, time-varying failure rate data is obtained for components of the workstation blade. The failure rate data correlates the elapsed operating time with the probability of failure for each of a plurality of components of the workstation blade. An example of time-varying failure rate data was provided in FIG. 3.

In step 202, the elapsed operating time of each component is tracked. This step 202 may be performed entirely by the BMC of the workstation blade. A software module added to the BMC tracks the elapsed operating without participation of the operating system and without the use of the CPU, so as not to require any of the finite system memory and processor bandwidth.

Conditional step 204 queries whether a system failure has occurred (e.g. the blade has been determined to be non-functional). The BMC will continue to track the elapsed operating time of the various components according to step 202, and when a failure is detected in step 204, the BMC records the time of failure and the elapsed operating time of each component at the time of failure. Again, the elapsed operating times of the components are not necessarily equal, as some components may be replaced during the service life of the workstation blade. The following steps are a generalized MAP for a generic system.

Conditional step 206 involves a determination of whether video is present, as one specific example of what could constitute a "system failure" per conditional step 204. If video is not present, the MAP narrows the cause of failure to one of two components: either a set of DIMMs or a video card. In step 207, the BMC uses the predetermined probability of failure (POF) and the elapsed operating time in terms of power-on hours (POH) of the DIMMs and the video card to determine that the video card has an 80% POF and the DIMM has only a 20% POF at the time of system failure. Thus, replacing the video card according to step 208 is 80% likely to resolve the system failure. In the unlikely even that replacing the video card does not resolve the system failure, the DIMM(s) can then be replaced according to step 210. By identifying and replacing the component with the highest POF first, as illustrated in this example, failure resolution may be performed much faster and more efficiently.

Likewise, if a lack of video (step 206) is not at issue, then conditional step 212 involves a determination of whether the operating system (OS) boots. If the OS does boot, then the MAP narrows the cause of failure to being the HDD, DIMM(s), or processor, listed in decreasing order of POF. The BMC determines the POFs for each of these components as a function of their respective elapsed operating times according to step 213. Thus, the HDD (45% POF) may be first replaced in step 214. If the system failure is not resolved by replacing the HDD, the DIMM (40% POF) is next replaced in step 216. Lastly, if replacing the DIMM does not resolve the system failure, the processor may be replaced in step 218, which is certain to resolve the system failure assuming the assumption that the HDD, DIMM, or processor was the cause of failure.

If the OS does not boot per conditional step 212, but the BIOS does boot per conditional step 220, then the MAP narrows the cause of failure to the same group: the HDD, DIMM(s), or processor, according to the same POFs. Again, these components may be replaced in order of decreasing POF until the system failure is resolved according to steps 214, 216, and 218.

If the OS does not boot per conditional step 212 and the BIOS also does not boot per conditional step 220, then the cause of failure is narrowed to either the DIMM or the processor, and the POF for each component is determined per step 213. According to decreasing POF, the DIMM is replaced first in step 222, followed by the processor in step 224, if necessary.

The sample MAP provided in FIG. 5 could be extended beyond the example components of DIMMs, processor, graphics card, and HDD to a more comprehensive system MAP covering a more complete listing of components and possible failures.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium include: an electrical connection having one or more wires, a portable computer diskette, a hard disk, random access memory (RAM), read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. Computer usable program code contained on the computer-usable medium may be communicated by a propagated data signal, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining failure rate data correlating the elapsed operating time with the probability of failure for each of a plurality of components of a computer system;
    tracking the elapsed operating time of each component of the computer system, wherein the step of tracking is performed by a baseboard management controller independently of an operating system or a central processing unit; and
    in response to a failure of the computer system, automatically determining the probability of failure of each component at the time of failure of the computer system from the failure rate data, and generating a component replacement list indicating the component having the highest probability of failure at the time of failure.

2. The method of claim 1, further comprising:
    narrowing the cause of failure of the computer system to a subset of two or more but fewer than all of the components; and
    thereafter automatically determining the probability of failure of each component in the subset at the time of failure from the failure rate data, and generating a component replacement list indicating which component of the subset has the highest probability of failure at the time of failure.

3. The method of claim 1, further comprising:
    automatically generating a visible or audible alert in response to the component replacement list using the baseboard management controller and sending the alert using the baseboard management controller to a system administrator over a network.

4. The method of claim 3, further comprising:
generating a visible or audible alert on or near the component having the highest determined probability of failure in response to the component replacement signal.

5. The method of claim 1, further comprising:
storing the component replacement list in a system event log.

6. The method of claim 1, further comprising:
ranking the components according to their respective probabilities of failure and visually displaying the ranking.

7. The method of claim 6, further comprising:
replacing the components in order of decreasing probability of failure until the failure of the computer system is resolved.

8. A computer program product including computer usable code embodied on a non-transitory computer readable medium, the computer usable code for performing failure analysis on components of a computer system, the computer usable program code including:
computer usable program code for obtaining failure rate data correlating the elapsed operating time with the probability of failure for each component;
computer usable program code for tracking the elapsed operating time of each component without using an operating system or a central processing unit of the computer system; and
computer usable program code for, in response to a failure of the computer system, automatically determining the probability of failure of each component at the time of failure of the computer system from the failure rate data, and generating a component replacement list indicating the component having the highest probability of failure at the time of failure.

9. The computer program product of claim 8, further comprising:
computer usable program code embodying a maintenance analysis procedure for narrowing the cause of failure of the computer system to a subset of two or more but fewer than all of the components; and
computer usable program code for thereafter automatically determining the probability of failure of each component in the subset at the time of failure from the failure rate data, and generating a component replacement signal indicating which component of the subset has the highest probability of failure at the time of failure.

10. The computer program product of claim 8, further comprising:
computer usable program code for causing a visible or audible alert to be automatically generated in response to the component replacement list using a baseboard management controller; and
computer usable program code for sending the alert using the baseboard management controller to a system administrator over a network.

11. The computer program product of claim 8, further comprising:
computer usable program code for generating a visible or audible alert on or near the component having the highest determined probability of failure in response to the component replacement list.

12. The computer program product of claim 8, further comprising:
computer usable program code for ranking the components according to their respective probabilities of failure and visually displaying the ranking.

13. A computer system comprising:
a plurality of components; and
a baseboard management controller containing computer usable program code for performing failure analysis, the computer usable program code including computer usable program code for obtaining failure rate data correlating the elapsed operating time with the probability of failure for each component, computer usable program code for tracking the elapsed operating time of each component without using an operating system or a central processing unit of the computer system, and computer usable program code for, in response to a failure of the computer system, automatically determining the probability of failure of each component at the time of failure of the computer system from the failure rate data, and generating a component replacement list indicating the component having the highest probability of failure at the time of failure.

14. A method comprising:
obtaining failure rate data correlating the elapsed operating time with the probability of failure for each of a plurality of components of a computer system;
tracking the elapsed operating time of each component of the computer system; and
in response to a failure of the computer system, automatically determining the probability of failure of each component at the time of failure of the computer system from the failure rate data, generating a component replacement list indicating the component having the highest probability of failure at the time of failure, and storing the component replacement list in a system event log.

15. The method of claim 14, wherein the step of tracking the elapsed operating time of each component is performed by a baseboard management controller of the computer system, wherein the elapsed operating time is tracked independently of an operating system or a central processing unit.

16. The method of claim 14, further comprising:
narrowing the cause of failure of the computer system to a subset of two or more but fewer than all of the components; and
thereafter automatically determining the probability of failure of each component in the subset at the time of failure from the failure rate data, and generating a component replacement list indicating which component of the subset has the highest probability of failure at the time of failure.

17. The method of claim 14, further comprising:
automatically generating a visible or audible alert in response to the component replacement list using a baseboard management controller and sending the alert using a baseboard management controller to a system administrator over a network.

18. The method of claim 17, further comprising:
generating a visible or audible alert on or near the component having the highest determined probability of failure in response to the component replacement signal.

19. The method of claim 14, further comprising:
ranking the components according to their respective probabilities of failure and visually displaying the ranking.

20. The method of claim 19, further comprising:
replacing the components in order of decreasing probability of failure until the failure of the computer system is resolved.

* * * * *